Patented Nov. 2, 1937

2,097,528

UNITED STATES PATENT OFFICE 2,097,528

METHOD OF MAKING RUBBER ARTICLES

Harold A. Morton, Akron, Ohio, assignor to American Anode, Inc., Akron, Ohio, a corporation of Delaware No Drawing. Application October 27, 1934, Serial No. 750,383

15 Claims. (Cl. 18—58)

This invention relates to the manufacture of rubber articles by coagulation of rubber from rubber latex upon a suitable form or mold, and especially to the manufacture of rubber articles having determinate portions thicker or thinner than other portions of the articles to meet special service requirements.

The chief objects of the present invention are to provide a simple, inexpensive, and highly efficient method for making rubber articles having determinate areas or portions of varying thickness; to provide for the manufacture of such articles directly from rubber latex; to provide a method for controlling the thickness of rubber deposited from latex upon various portions of a form; and other objects which will appear from the following description of the invention.

There has been considerable demand for a rubber glove having relatively thin fingers and palm, and an integral but relatively thicker wrist portion, but no wholly satisfactory method has thus far been proposed for making such a glove. The present invention provides such method, although, as will hereinafter appear, its usefulness is by no means limited to the manufacture of gloves. For simplicity of description, however, the invention will be described in connection with the manufacture of such a rubber glove, it being understood that such description is merely illustrative and not limitative of the invention.

In one embodiment of the present invention, as applied to the manufacture of a rubber glove, a glove form of usual preferably impervious construction is employed, although porous forms are not excluded. The form is cleaned and then provided with a substantially uniform coating of a latex coagulant, for example, by immersing the form in a solution containing 500 grams of calcium chloride dissolved in 1000 cc. of denatured alcohol and then evaporating a substantial part of the alcohol to provide a non-flowing coating of coagulant of substantially uniform effectiveness over the entire form. The effectiveness of the coagulant then is reduced at portions of the form where a thinner deposit is desired, preferably by partially neutralizing the coagulant at such portions. In this example, thin fingers and palm are desired, and the form therefore is dipped momentarily, fingers first, to a desired depth in a dilute solution of a suitable neutralizing agent which will react with and partially neutralize the calcium chloride, such as a 10% aqueous or alcoholic solution of potassium hydroxide. The form with its coating of coagulant, portions of which have been partially neutralized, then is immersed for about one minute in an aqueous dispersion (hereinafter called simply "latex") containing 100 parts by weight of rubber added as the concentrated (60%) latex of commerce, 1.3 parts sulfur, 0.6 parts organic accelerator, 0.5 parts zinc oxide, 2.0 parts of an age-register, and 0.5 parts of a stabilizing agent such as potassium hydroxide. The form together with the resultant deposited rubber is withdrawn from the latex and is rotated in air for a short time to distribute excess latex over the form, and the rubber then is washed, dried, and vulcanized in the usual manner. The wrist portion of the finished glove is found to be considerably thicker than the fingers and palm although there is no abrupt line of demarcation between the thicker and thinner areas as would be the case if the wrist portion alone were simply redipped in latex to apply a heavier coating there.

In a second embodiment of the invention, two or even more, dips into the latex are employed to secure the desired result. For example, a form may be coated uniformly with calcium chloride as in the preceding example, and then immersed, without neutralizing any of the coagulant, into latex for about thirty seconds. The form with the deposited rubber then is immersed, fingers first, to a point above the palm, in a 5% aqueous solution of sodium hydroxide, the form being withdrawn quickly. In this manner, coagulant which has diffused through to the outer surface of the rubber at the fingers and palms is partially neutralized, while the coagulant present upon the outer surface of the rubber at the wrist portion of the form is unaffected and remains fully active. The form then is immersed again in the latex for about thirty seconds, during which time considerable rubber is deposited at the wrist portion of the glove whereas relatively little is deposited upon the fingers and palm. The deposited rubber finally is washed, dried, and vulcanized according to usual procedure to produce a glove in which the rubber is wholly integral although considerably thinner at the fingers and palm than at the wrist.

As a further modification of the invention, it is possible to accomplish the desired results by immersing a form, either porous or impervious, in latex without first applying a coagulant coating to the form, withdrawing the form together with a thin adherent film of uncoagulated latex, then applying a coagulant to this film to coagulate the rubber, and thereafter neutralizing a portion of the coagulant associated with the rubber, and continuing as in the preceding examples.

It is obvious that alkaline neutralizing agents other than those hereinabove mentioned may be used for reducing the effectiveness of the coagulant and that any suitable agent either in solution or not may be employed. For example, ammonia is quite effective, and sodium bicarbonate likewise may be used in some cases, applied either as a solution, or dusted on in powder form. Most of the commonly used coagulants react with and are neutralized by alkalies but the invention obviously is not limited to the use of any specific coagulant or neutralizing agent, but extends to all known coagulants and neutralizing agents therefor. For example, if an acid latex is used, the coagulant itself necessarily would be alkaline in nature and the neutralizing agent in turn would be acid.

The preceding description contemplates the use of a chemical neutralizing agent to react with the coagulant and thereby to reduce its effectiveness which is a preferred form of the invention because of its simplicity and greater ease of execution. Other means of reducing the effectiveness of the coagulant in a determinately restricted portion of the coating however, are within the scope of this invention. One such means is to remove a portion of the coagulant from determinate areas of the coating, as by immersing the form with its coating of coagulant in a solvent to dissolve some of the coagulant off the form. The solvent preferably should contain some of the coagulant in solution so that an equilibrium may be set up to prevent removing all or too much of the coagulant. For example, the form coated with coagulant by dipping in a solution containing 500 grams of calcium chloride per 1000 cc. of solvent as in the first example hereinabove described may be partially immersed for a short time in alcohol containing only 100 grams of calcium chloride per liter to dissolve a part of the coagulant off the form. Other similar modifications are possible For purposes of illustration the invention has been described with reference to particular coagulants, solvents, and latex compositions, but it is obvious that the invention is not limited to such materials and that other suitable solvents and coagulants such as those described in U. S. Patent 1,908,719 may be used. Likewise the term "latex" and/or "rubber latex" has been used in a generic sense to denote any natural or artificially prepared coagulable dispersion of caoutchouc, gutta percha, balata, synthetic rubber, or similar gum or resin whether concentrated, diluted, thickened, thinned, stabilized, or otherwise preliminarily treated. The "latex" may contain any of the usual compounding ingredients as may be desired.

As was indicated above, the invention is by no means limited to the manufacture of rubber gloves, but is equally useful in manufacturing any rubber article wherein thin and thick portions are required and which may be made by coagulating latex upon a form. Examples of such articles are balloons, toys, bathing caps, footwear, rubber coated metal articles, sheet rubber, and numerous other articles.

The term "form" therefore includes any mold or base or form upon which latex is coagulated to make such articles, whether or not the rubber subsequently is stripped from the form, and may be either porous or non-porous and of any suitable shape and material unless otherwise indicated.

Additional modifications and variations may be made in the mode of procedure and materials hereinabove described without departing from the scope of the invention as defined by the appended claims.

I claim:

1. The method which comprises providing a form having an exposed surface carrying a latex coagulant, reducing the effectiveness of the coagulant in a determinately restricted portion of the surface, then applying latex to the form to deposit thereon latex rubber, and drying the deposited rubber.

2. The method which comprises applying to an impervious form a coating containing a latex coagulant, reducing the effectiveness of the coagulant in a determinately restricted portion of the coating, then applying latex to the coated form to deposit thereon latex rubber, and drying the deposited rubber.

3. The method which comprises providing a form having an exposed surface carrying a latex coagulant, at least partially neutralizing the coagulant in a determinately restricted surface area, then applying latex to the form to deposit thereon latex rubber, and drying the deposited rubber.

4. The method which comprises providing a form having an exposed surface carrying a latex coagulant which reacts with and is neutralized by alkali, applying alkali to a determinately restricted portion of the surface at least partially to neutralize the coagulant at such portion, applying latex to the form to deposit thereon latex rubber, and drying the deposited rubber.

5. The method which comprises applying to an impervious form a coating containing a latex coagulant, treating a determinately restricted portion of the coating with a solution of a neutralizing agent, immersing the coated form in latex, and drying the resultant deposited rubber.

6. The method which comprises providing a form having an exposed surface carrying a latex coagulant, applying latex to the form to deposit thereon a coating of latex rubber, applying a neutralizing agent to a determinately restricted portion of the deposited rubber at least partially to neutralize coagulant which will have diffused through the rubber, and again applying latex to the form to deposit upon at least a part thereof a second coating of latex rubber, and drying the deposited rubber to provide an integral rubber article of varying thickness.

7. The method which comprises applying to an impervious form a coating containing a latex coagulant, immersing the form in latex to deposit thereon a coating of latex rubber, applying a neutralizing agent to a determinately restricted portion of the rubber deposit at least partially to neutralize coagulant which will have diffused through the rubber, then again immersing the form in latex to deposit thereon a second coating of latex rubber, and drying the deposited rubber to provide an integral rubber article of varying thickness.

8. The method which comprises applying to an impervious form a coating containing a latex coagulant which reacts with and is neutralized by alkali, immersing the coated form in latex to deposit thereon a coating of latex rubber, applying a dilute alkaline solution to a determinately restricted portion of the rubber deposit at least partially to neutralize coagulant which will have diffused through the rubber, then again immersing the form in latex, and drying the deposited rubber to provide an integral rubber article of varying thickness.

9. The method of making a rubber glove having relatively thin fingers and a relatively thicker wrist, which comprises coating a glove form with coagulant, reducing the effectiveness of the coagulant at the fingers of the form, immersing the form in latex, and drying the resultant deposited rubber.

10. A method as defined in claim 9 in which the effectiveness of the coagulant is reduced by treatment with a solution of a neutralizing agent.

11. The method of making a rubber glove having relatively thin fingers and a relatively thicker wrist, which comprises coating a form with a latex coagulant, immersing the form in latex to deposit thereon a substantially uniform thin coating of latex rubber, applying a neutralizing agent to the fingers of the deposited rubber at least partially to neutralize coagulant which will have diffused through the rubber, again immersing the form together with the thin rubber deposit in latex, and drying the resulting integral rubber deposit.

12. The method which comprises providing a form having an exposed surface carrying a latex coagulant, dissolving coagulant off a determinately restricted portion of the surface, associating the form with latex to deposit thereon latex rubber, and drying the deposited rubber.

13. The method which comprises coating an impervious form with a latex coagulant, immersing a part of the form in a solvent for the coagulant, then immersing the form in latex to deposit thereon latex rubber, and drying the deposited rubber.

14. The method which comprises immersing an impervious form in a fluid composition containing a latex coagulant dissolved in a volatile solvent, removing the form together with an adherent coating of the composition, evaporating at least a part of the solvent from the coating, immersing at least a portion of the coated form for a short time in a solvent for the coagulant, then immersing the form in latex to deposit thereon latex rubber, and drying the deposited rubber.

15. The method which comprises immersing an impervious form in a fluid composition containing a latex coagulant dissolved in a volatile solvent, removing the form together with an adherent coating of the composition, evaporating at least a part of the solvent from the coating, immersing a portion of the coated form in a solvent for the coagulant containing a quantity of the coagulant dissolved therein, then immersing the form in latex to deposit thereon latex rubber, and drying the deposited rubber.

HAROLD A. MORTON